INVENTOR
FREIDA DALE

June 19, 1962 F. DALE 3,039,166
MACHINE FOR CUTTING WOOL FROM WOOL-COVERED SKINS
Filed June 29, 1959 5 Sheets-Sheet 2

INVENTOR
FREIDA DALE
By Wendwoth, Lind & Ponack
attorneys

June 19, 1962 F. DALE 3,039,166
MACHINE FOR CUTTING WOOL FROM WOOL-COVERED SKINS
Filed June 29, 1959 5 Sheets-Sheet 3
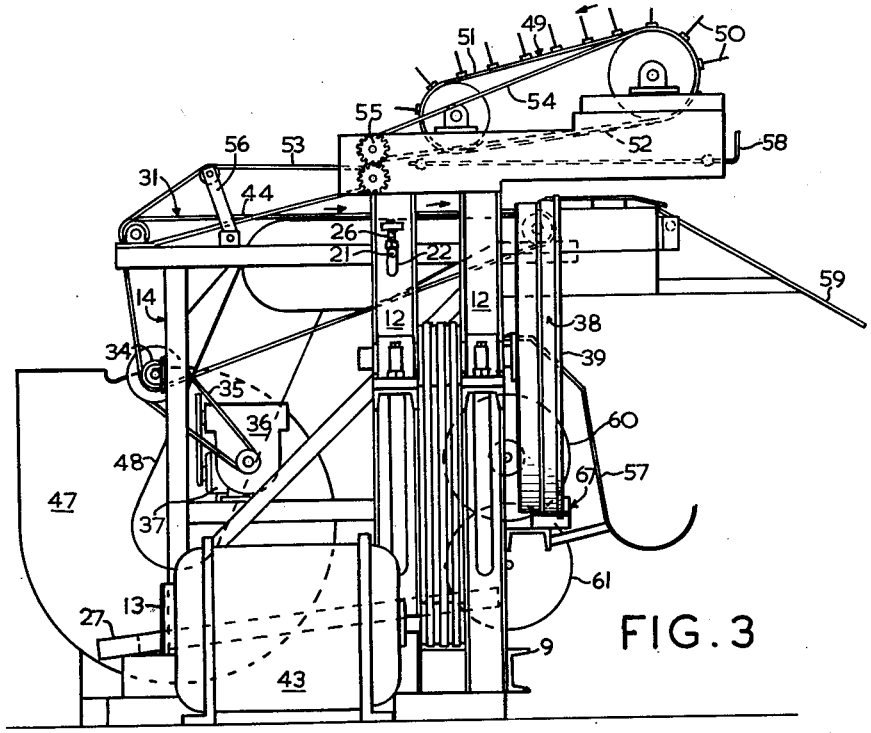
INVENTOR
FREIDA DALE
By Wendworth, Lind & Ponack
Attorneys

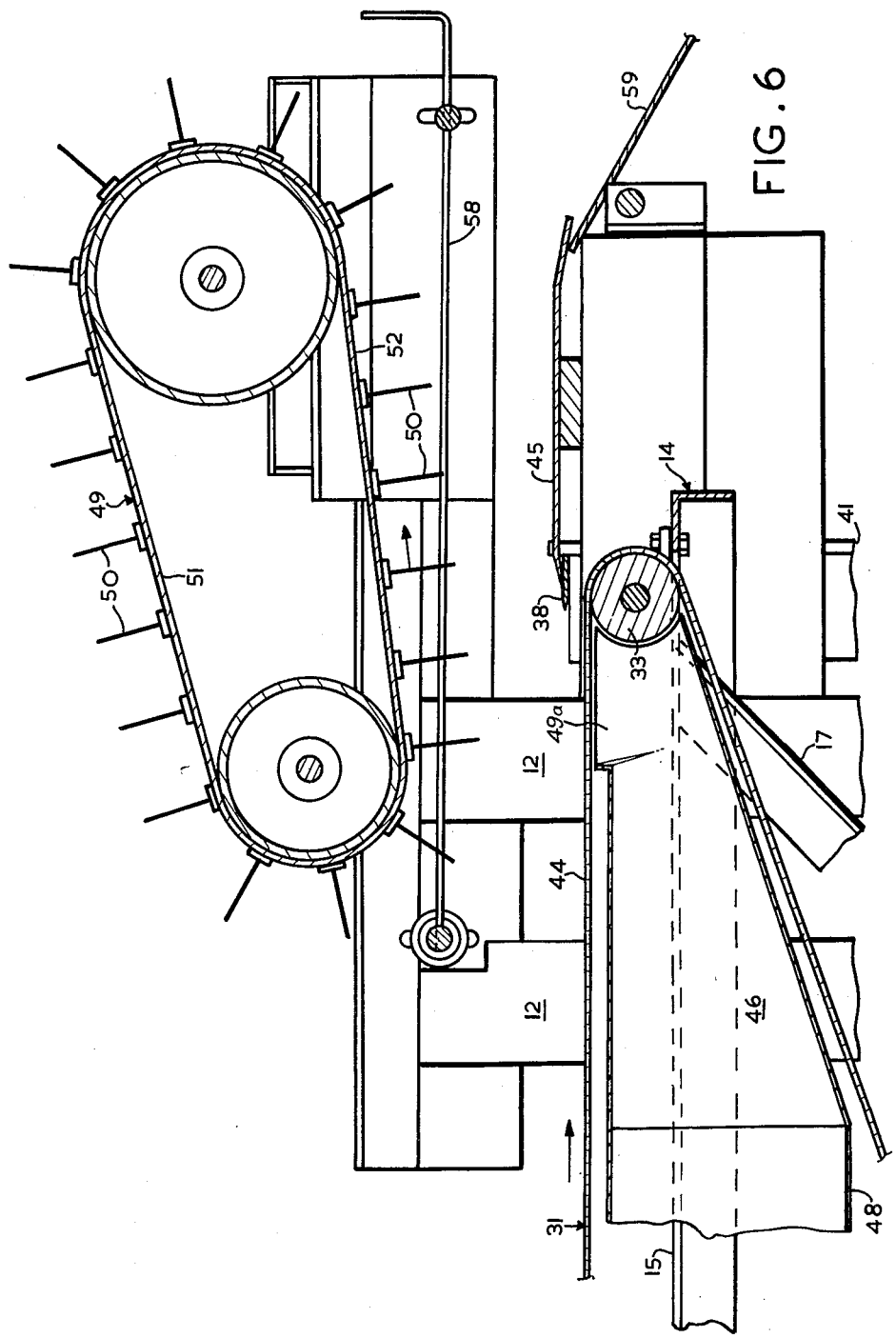

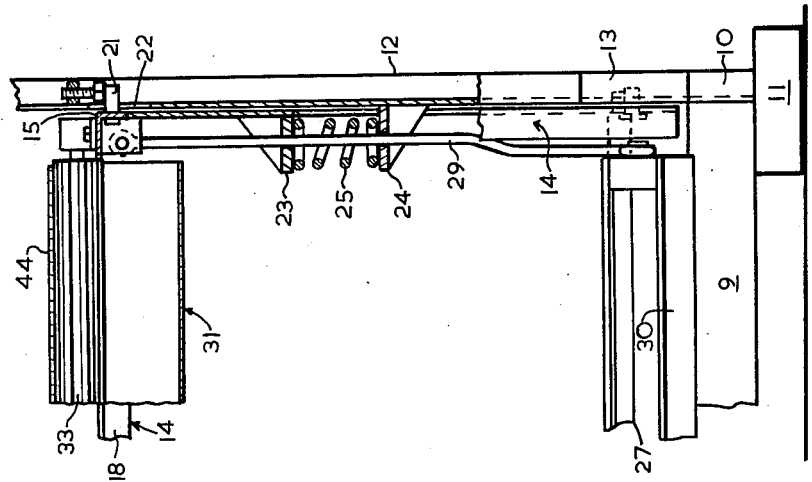
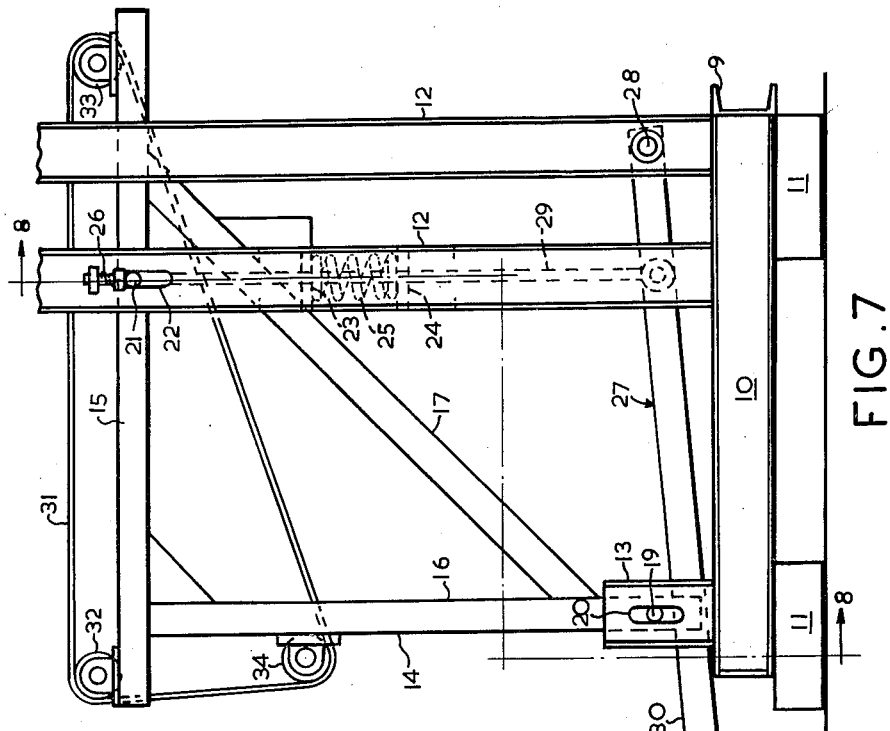

3,039,166
MACHINE FOR CUTTING WOOL FROM
WOOL-COVERED SKINS
Freida Dale, 32 Streatfield Road, Bellevue Hill, Sydney,
New South Wales, Australia, assignor of one-half to
Sadie Dale, New South Wales, Australia
Filed June 29, 1959, Ser. No. 823,579
Claims priority, application Australia July 8, 1958
5 Claims. (Cl. 26—15)

This invention relates to a machine for cutting or shearing wool or hair, hereinafter referred to as wool, from sheep skins or like wool-or-hair covered skins, hereinafter referred to as sheep skins, to a desired depth, without injury to the wool remaining thereon or to the skins themselves. This machine can be used for removing wool from such skins irrespective of whether these have been previously cleansed or are in greasy condition, cutting of the wool being effected by an endless steel cutter.

In general the invention is a machine for cutting or shearing sheep skins or the like, comprising a stationary frame, a movable frame movably mounted on said stationary frame for movement in a substantially vertical direction, spring means between said movable frame and said stationary frame urging said movable frame upwardly relative to said stationary frame, adjustable stop means on said stationary frame against which said movable frame is moved by said spring means, a conveyer on said movable frame, means on said movable frame for moving said movable frame downwardly against said spring means, means for holding a skin to be shorn tightly against said conveyer, an approximately horizontal cutting blade on said stationary frame above said conveyer, its edge extending substantially at right angles to the direction of conveying movement of the conveyer and toward which said movable frame is movable vertically, and means on said stationary frame above said conveyer and said blade for combining and conveying the wool on the skin to be sheared toward and past said blade.

In order to expound the nature of the invention a specific embodiment of the cutting machine and possible modifications thereof are hereafter described by way of example only.

Figure 1:
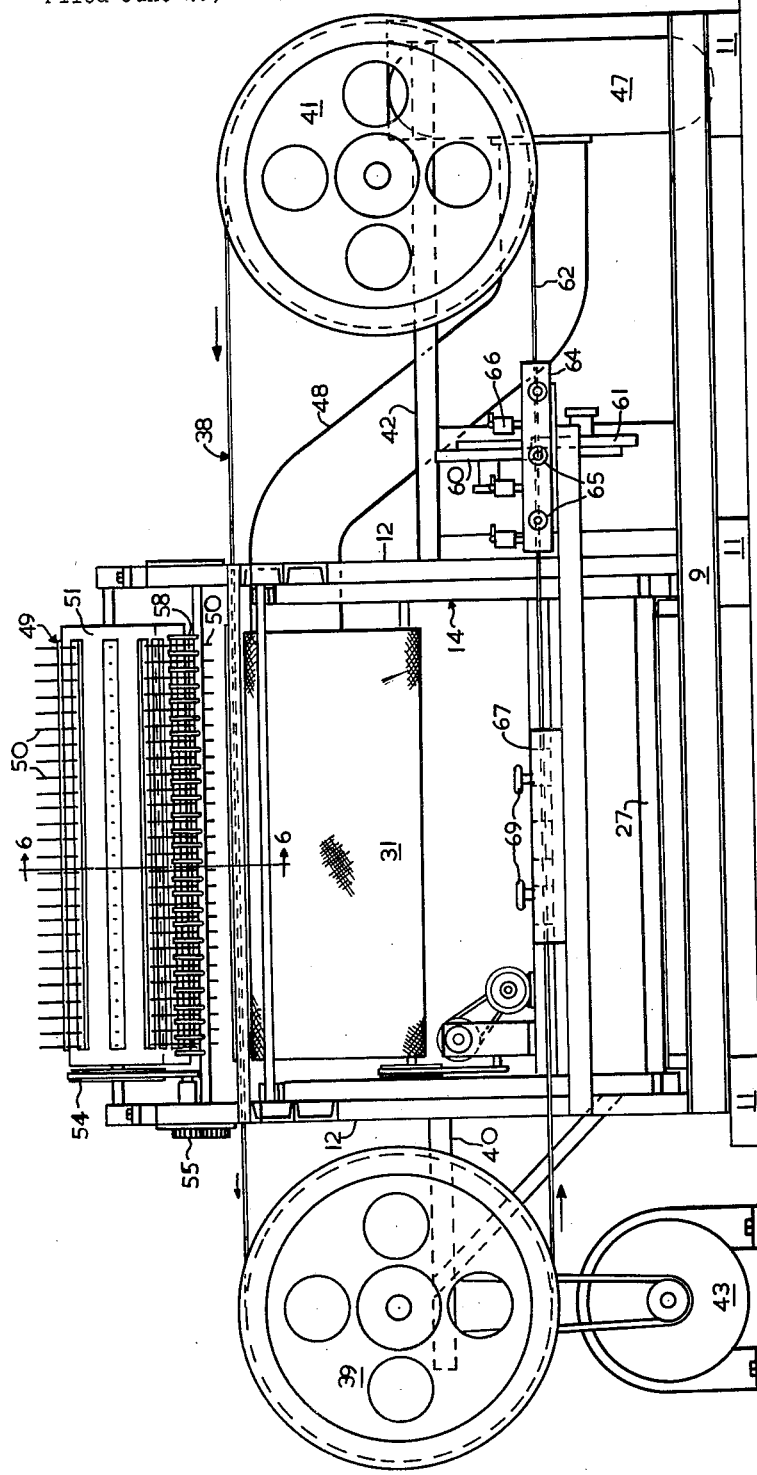
Figure 2:
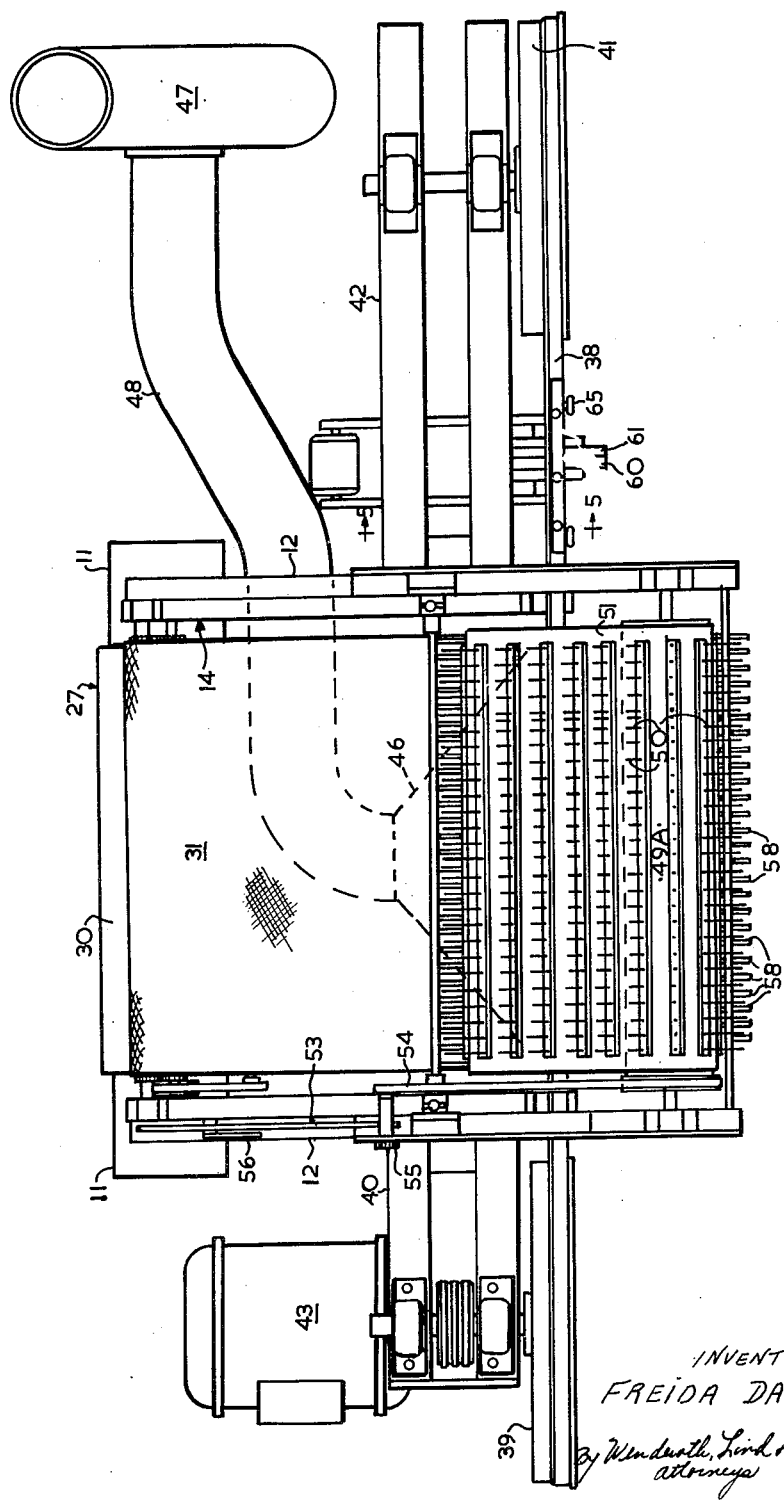

The specific embodiment of the invention is illustrated in the accompanying drawings in which:

FIG. 1 is a front elevation of the machine showing the section thereof from which the shorn skins and fleeces emerge. The receiving troughs for said shorn skins and fleeces have been removed for clarity, FIG. 2 is a plan view of the machine, FIG. 3 is a side elevation of the cutter drive end of the machine and showing the driving means therefor, FIG. 4 is a longitudinal section of the grease removing means located about the lower flight of the cutter band, FIG. 5 is an end elevation in section on the line 5—5 in FIG. 2, showing the band sharpening device associated with the cutter band, FIG. 6 is an elevation in section on the line 6—6 in FIG. 1.

FIG. 7 is a similar elevation to FIG. 3, but to a larger scale, showing the fixed and movable machine frames only, and the operating pedal for the latter, most of the working parts having been omitted for clarity, and, FIG. 8 is a fragmentary elevation in section on the line 8—8 in FIG. 7.

In said specific embodiment the machine has a frame structure built up from a long horizontal longitudinal channel member 9 and rearwardly extending channels 10 mounted on pads 11. Pairs of vertical parallel channels 12 are secured to the members 10 adjacent the member 9. Short vertical channels 13 are similarly secured to the opposite ends of the members 10.

A vertically displaceable box frame 14 (FIG. 7) is mounted between the sets of vertical channels just described, in the following manner. The sides of the frame 14 are composed of horizontal angles 15, vertical angles 16, diagonal braces 17, joined by transverse angles 18. Pins 21 and 19 are secured to the angles 15 and 16 respectively and engage slots 20 and 22 in the channels 13 and 12 respectively so that the frame 14 is held between the vertical machine channel members.

Gusseted pads 23 are secured to each bracing angle 17 on the frame 14 and similar pads 24 are secured to the channels 12 as shown in FIGS. 7 and 8. Heavy compression springs 25 are secured between the pads 23 and 24 so that they force the frame 14 upwardly. Stops 26 adjustably bearing against the pins 21 limit this upward movement. A pedal frame 27 is pivotally secured at 28 between the channels 12 and vertical tie rods 29 pivotally secure the frame 14 to said pedal 27 which is a lever with considerable mechanical advantage. If the machine operator places his foot on the front 30 of the pedal frame 27, the frame 14 will be forced down against the action of the springs 25.

The frame 14 carries an air pervious wire mesh conveyor 31 mounted on milled rollers 32, 33 and 34. The roller 34 is driven by a chain drive 35 (see FIG. 3) driven by a reduction gear and motor 36 and 37 respectively, also mounted on the frame 14.

An endless horizontal steel band cutter blade 38 (FIG. 1) is mounted on a driving pulley 39 carried in bearings on an out-rigger frame 40 secured to the channels 12 on one side, and on an idler pulley 41 similarly mounted on a frame 42 on the other side of the machine. The pulley 39 is driven by a motor 43.

The endless steel cutter 38 passes over the roller 33 and over one end of the upper run 44 of the conveyor 31 at right angles to the direction of progress of that conveyor, at a required distance above the latter, which may be adjusted by the stop 26 and which corresponds to the thickness of the skins to be shorn plus the height of such residue wool, if any, as it is desired to leave on the skin surface. Where the cutter band 38 traverses the conveyor 31, it is held in position by a horizontal plate or guide 45 (FIG. 6) arranged on top of the band, said guide extending over the width of the conveyor between the channels 12 and constituting conjointly an envelope or sheath for the band from which only the cutting edge of the latter extends to a required width. The guide 45 is adjustable as to height and therefore serves at the same time for controlling the height of the band 38 above the conveyor 31.

Inside the conveyor 31 is mounted a funnel 46 (FIG. 6) connected to a suction air pump 47 (FIG. 1) by a flexible conduit 48, the funnel extending over the entire width of the conveyor and being provided at its outer end with a port 49a (FIGS. 2 and 6) closely adjacent the roller 33 and conveyor 31 underside so that the air sucked in by the pump enters the funnel via the air pervious belt constituting the conveyor 31. This arrangement ensures that each skin placed upon the upper run 44 of the conveyor 31 and passed over the section of the latter beneath the cutter band 38, is firmly retained on the conveyor by the vacuum produced inside the funnel 46 and is thereby safely maintained in the required position relative to the cutter band 38, irrespective of the resistance to the progress of the skin due to the density of the wool which strikes the cutter blade 38 and is to be shorn by the latter during the operation of the machine.

The flexible conduit 48 enables the funnel 46 to move up and down with the conveyor 31 and frame 14.

In order to ensure adequate uniformity of the density of the wool on the skin passing through the cutting zone of the machine, the latter is provided with a rotary comb 49 arranged above the conveyor belt 31 and cutter 38, the comb being provided with a plurality of pins or bristles 50 uniformly arranged on a belt 51 of suitable length, the lower run 52 of the comb 49 being movable along the upper run of the conveyor, at the same speed and in the same direction as the latter, in a diverging path.

The comb 49 is driven from the conveyor 31 by chain drives 53 and 54 (FIGS. 1 and 2) and spur gears 55. The chain drive 53 is provided with a spring loaded idler 56 (see FIG. 3) which allows the frame 14 to be moved vertically without disturbing the said drive.

During the operation of the machine the pins or bristles 50 enter the wool on the skin to be shorn and guide it towards and over the cutter blade 38. After the fleece has been shorn off the skin by the cutter blade 38, it is guided along by the comb 49 over the plate 45, whereas the shorn skin or pelt remains on the conveyor belt for a predetermined distance and is thereby made to drop into a skin receiving hopper 57 (FIG. 3). A grid 58 consisting of a number of parallel rods is arranged between the lower run 52 of the comb 49 and the upper run 44 of the conveyor 31, the pins or bristles 50 of the comb 49 being arranged to pass between and along the rods of the grid 58 during the operation of the comb 49 and the arrangement being such that the lower run 52 of the comb 49 is gradually withdrawn from said grid 58 during its progress, the grid 58 thus acting as a stripper for the fleece which during its further progress and after detachment from the comb is moved over the rear portion of the guide plate 45 towards a bin, container, conveyor, or plate 59 adapted for carrying away the cut fleece from the machine.

The pelts follow the path of the conveyor 31 until they reach a station beyond the funnel port 49a where they are then detached from the conveyor 31 and collected, separate from the shorn wool, in the hopper 57 or on a conveyor or other means for removing same from the machine.

The machine according to the invention is further provided with such guards (not shown) as assure adequate safety of operation, particularly in parts adjoining the cutter blade 38 and the rotary comb 49.

Moreover the machine is provided with means for sharpening the cutter band.

This consists of two abrasive wheels 60 and 61 (FIG. 3) mounted above and below the lower flight 62 of the cutter 38, on the frame 42. The wheels may be moved vertically by adjusting screw 63 (see FIG. 5). The wheels 60, 61 are moved towards or away from each other by being mounted respectively on triangular plates as shown which are slidable in the frame 42. The screw 63 has right handed and left handed threaded parts which engage respective extensions of the triangular plates into the frame 42. The screw is rotatable but is held against axial movement so that its rotation moves the triangular plates and the wheels 60, 61 towards or away from each other. The band 38 is sharpened in a V by the action of the wheels 60 and 61 during the operation of the machine. The blade is held adjacent the wheels by a block 64 and adjusting screws 65 load the blade against said wheels. Lubricating and cooling oil dispensing containers 66 are also carried on the block 64 (see FIG. 1).

Grease from the wool is picked up by the blade 38 and to remove this, before it can be deposited on the wheels 60 and 61, a blade cleaning device 67 (see FIGS. 1 and 4) is mounted about the lower flight 62 of the blade. The device 67 comprises felt blocks 68 impregnated with kerosene which are pressed onto the top and bottom of the blade 38 by adjusting screws 69.

In operation the skins are placed on the conveyor 31 and as they encounter the blade 38, the pedal 27 is depressed to ensure that the skin passes below the said blade. The pedal is now released and the machine completes the shearing of the fleece.

Means are also provided to permit the easy adjustment of the conveyor speed and of the cutter speed either conjointly or independently. Moreover means are preferably provided which permit temporary removal of the comb 49 and/or the blade 38 from the conveyor 31, for access to those parts and/or to the conveyor 31 for cleaning and adjustment purposes.

I desire it to be understood that I do not wish protection by Letters Patent to be limited to the aforedescribed details as these are capable of further modification within the scope of the present invention.

What I claim is:

1. A machine for cutting or shearing sheep skins and the like, comprising a stationary frame, a movable frame movably mounted on said stationary frame for movement in a substantially vertical direction, spring means between said movable frame and said stationary frame urging said movable frame upwardly relative to said stationary frame, adjustable stop means on said stationary frame against which said movable frame is moved by said spring means, a conveyer on said movable frame, means on said movable frame for moving said movable frame downwardly against the action of said spring means, means for holding a skin to be shorn tightly against said conveyer, an approximately horizontal cutting blade on said stationary frame above said conveyer, its edge extending substantially at right angles to the direction of conveying movement of the conveyor and toward which said movable frame is movable vertical, and means on said stationary frame above said conveyer and said blade for combing and conveying the wool on the skin to be shorn toward and past said blade.

2. A machine as claimed in claim 1 in which said conveyer is an apertured endless belt, and said means for holding the skin to be shorn tightly against said conveyer comprises an upwardly open hood positioned close to the bottom of said conveyer along the upper run thereof, and a vacuum producing means connected to said hood, whereby the skin to be shorn is held against the conveyer by the vacuum produced in the hood.

3. A machine as claimed in claim 1 in which said means on said movable frame for moving said movable frame downwardly comprises a foot pedal lever pivoted at one end to said stationary frame, and a rod pivoted to said foot pedal lever between the ends thereof and to said movable frame.

4. A machine as claimed in claim 1 in which said conveyer is an apertured endless belt and said means for combing and conveying the wool on the skin to be shorn comprises a second endless belt member having a plurality of teeth thereon, the lower run of said second endless belt member being above and movable in the same direction as the upper run of the conveyer and diverging from the upper run of the conveyer in their mutual direction of motion and extending substantially at right angles to said blade.

5. A machine as claimed in claim 4 in which said means for combing and conveying the wool on the skin to be shorn further includes a plurality of parallel rods adjacent the end of the lower run of said second endless belt member extending in the direction of movement of the lower run of said second endless belt member and diverging from said endless belt member in the said direction, said teeth on said second endless belt member extending between said parallel rods.

References Cited in the file of this patent
UNITED STATES PATENTS
2,046,963    Nelson _____ July 7, 1936
FOREIGN PATENTS
548,577    Great Britain _____ Oct. 15, 1942